United States Patent
Agrawal et al.

(10) Patent No.: US 9,866,820 B1
(45) Date of Patent: Jan. 9, 2018

(54) ONLINE CALIBRATION OF CAMERAS

(71) Applicant: Amazon Technologies, Inc., Reno, NV (US)

(72) Inventors: Amit Kumar Agrawal, Santa Clara, CA (US); Ilya Vladimirovich Brailovskiy, Mountain View, CA (US); Sharadh Ramaswamy, Sunnyvale, CA (US); Ambrish Tyagi, Palo Alto, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 159 days.

(21) Appl. No.: 14/321,519

(22) Filed: Jul. 1, 2014

(51) Int. Cl.
*H04N 13/02* (2006.01)
*G06K 9/00* (2006.01)

(52) U.S. Cl.
CPC ..... *H04N 13/0246* (2013.01); *G06K 9/00281* (2013.01); *H04N 13/0239* (2013.01)

(58) Field of Classification Search
None
See application file for complete search history.

(56) References Cited

U.S. PATENT DOCUMENTS

| | | | | |
|---|---|---|---|---|
| 2009/0207235 A1* | 8/2009 | Francini | ................. | G06K 9/209 348/46 |
| 2011/0205186 A1* | 8/2011 | Newton | ................. | G06F 3/011 345/175 |
| 2011/0251768 A1* | 10/2011 | Luo | ........................ | B60W 30/12 701/70 |
| 2012/0275667 A1* | 11/2012 | Lu | ........................... | G06T 7/002 382/118 |
| 2013/0016186 A1* | 1/2013 | Atanassov | ......... | H04N 13/0246 348/47 |
| 2013/0107039 A1* | 5/2013 | Mehta | ...................... | G06N 5/00 348/135 |
| 2014/0037189 A1* | 2/2014 | Ziegler | ................... | G06T 17/00 382/154 |
| 2014/0098194 A1* | 4/2014 | Goma | ..................... | G06T 7/002 348/47 |

(Continued)

FOREIGN PATENT DOCUMENTS

JP 2015-70328 A * 4/2015 ......... H04N 5/23277

*Primary Examiner* — Hung Dang
(74) *Attorney, Agent, or Firm* — Polsinelli LLP

(57) ABSTRACT

An electronic device can have two or more pairs of cameras capable of performing three-dimensional imaging. In order to provide accurate disparity information, these cameras should be sufficiently calibrated. Automatic calibration can be performed by periodically capturing images with a pair of front-facing cameras and locating matching facial or other feature points in corresponding images captured by those cameras. Correspondences can be detected between feature points and the corresponding feature points can be normalized and outlier feature points can be rejected. A transformation matrix can be determined using at least a portion of remaining feature points and can be used to determine rotation and translation parameters to correct for misalignment between the cameras. The calibration parameters can be refined or otherwise adjusted, and can be used or stored for use in correcting images subsequently captured by those cameras.

18 Claims, 6 Drawing Sheets

(56) References Cited

U.S. PATENT DOCUMENTS

| | | | |
|---|---|---|---|
| 2014/0125771 A1* | 5/2014 | Grossmann | H04N 13/0246 348/47 |
| 2014/0211989 A1* | 7/2014 | Ding | G06K 9/6211 382/103 |
| 2014/0267809 A1* | 9/2014 | Tsubaki | H04N 5/23267 348/208.6 |
| 2015/0085149 A1* | 3/2015 | Tsubaki | H04N 5/23277 348/208.4 |
| 2015/0178927 A1* | 6/2015 | Olszamowski | G06T 7/0042 382/103 |

* cited by examiner

ONLINE CALIBRATION OF CAMERAS

BACKGROUND

People are increasingly interacting with computers and other electronic devices in new and interesting ways. For example, certain devices include stereoscopic cameras that are able to capture stereoscopic images that include disparity information, enabling those images to appear to be three-dimensional when properly rendered. In order for the relative distances of objects in the image to appear correctly, the cameras need to be adequately aligned such that the apparent disparity is accurate for the actual distance of the object, i.e., the optical axes are aligned in yaw, pitch, and roll. When using two distinct cameras, however, it is difficult to perfectly align the lens elements, such that a software adjustment is also required. While a calibration procedure can be used during the manufacture or testing process, it may be difficult to get users to recalibrate the cameras over time. Further, over a period of time as the device is being used, the stereo cameras can get misaligned (due to shocks or natural degradation). Further still, existing calibration approaches require placing specific calibration objects in specific locations and/or orientations, which can be confusing or at least not enjoyable for a user.

BRIEF DESCRIPTION OF THE DRAWINGS

Various embodiments in accordance with the present disclosure will be described with reference to the drawings, in which.

DETAILED DESCRIPTION

Figure 1A:
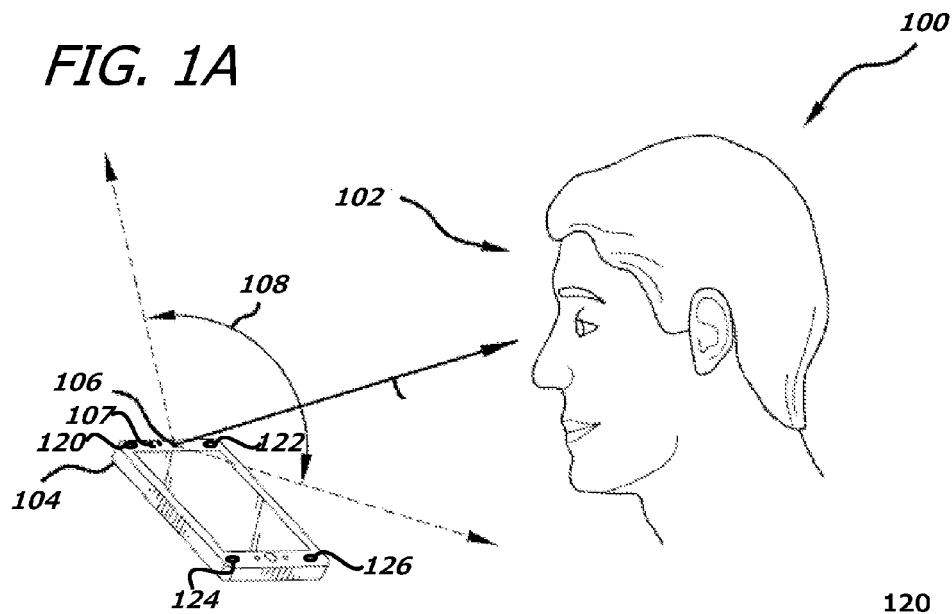
FIGS. 1A, 1B and 1C illustrate an example situation wherein a computing device using a pair of misaligned front-facing cameras is capturing an image of a user in accordance with various embodiments.

Systems and methods in accordance with various embodiments of the present disclosure may overcome one or more of the aforementioned and other deficiencies experienced in conventional approaches for calibrating two or more image capture elements, such as may comprise a stereoscopic camera. In particular, various embodiments enable a computing device including such a camera to automatically perform a recalibration process after the device has left the manufacturer and/or is in the possession of a user, or at another appropriate time. At least some embodiments enable two or more cameras to be aligned through software mechanisms in order to enable the captured stereo images to include a proper amount of disparity or depth information, as well as to have objects aligned in images captured by each camera. Various calibration processes are presented that enable any misalignment between the cameras to be determined, which can then be addressed when processing images captured by those cameras. Such approaches allow for compensation of any misalignment with lower cost and power consumption than conventional approaches.

For example, in at least some embodiments, a computing device with at least two front-facing cameras having at least partially overlapping fields of view can detect the presence of an object, such as a face of a user, facial features of the user, and/or any features represented in stereoscopic image data captured by the front-facing cameras. Portions of at least a first image acquired by a first camera of the stereo camera pair and a second image acquired by a second camera of the stereo camera pair can be analyzed to attempt to identity feature points corresponding to facial features of the user's face or other objects represented in the images. In various embodiments, the facial features identified in the images can have an amount of disparity that indicates its apparent distance from the computing device. However, since the cameras can become misaligned through use over time, the disparity information may be inaccurate, resulting in imprecise distance determinations. In order to account for at least some of these misalignments, a location of the identified feature points from the first image can be compared to a location of the identified features points from the second image to generate a mapping between corresponding feature points. In accordance with various embodiments, corresponding feature points can be normalized to remove or at least reduce the effect of one or more intrinsic camera characteristics, as may include focal length, principle point, etc. In this way, extrinsic camera characteristics between the camera such as rotation and translation can be updated to adjust for any misalignment between the cameras.

Once the feature points are normalized, one or more outlier feature points can be rejected as will be described further herein. Thereafter, at least a portion of the remaining corresponding feature points can be used to adjust one or more calibration parameters of the cameras, such that the face of the user at that distance will have the proper amount of disparity in a subsequently captured stereoscopic image. For example, the corresponding feature points can be used to determine at least rotation and translation parameters and/or various other parameters of the cameras. Various smoothing functions can be applied to the parameters to generate a continuous stream of parameters for each frame (or at each time interval) and the smoothed parameters can be used to adjust or otherwise calibrate the cameras such that an object a distance from the computing device will have a proper amount of disparity in a subsequently captured stereoscopic image. In order to improve the calibration, additional cameras can be used and/or the facial features (or multiple facial features) can be imaged at multiple locations (or in motion) in order to improve calibration over a range of distances.

In accordance with various embodiments, such an approach provides various advantages, including reduced power consumption and calibration processes that require less processing capacity while still providing sufficient calibration of any misaligned cameras. Various other functions and advantages are described and suggested below as may be provided in accordance with the various embodiments.

FIG. 1A illustrates an example situation 100 wherein a user 102 is interacting with a computing device 104. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, portable media players, and wearable computers (e.g., smart watches, smart glasses, etc.) among others. In this example, the computing device 104 includes a camera positioned on a front, side, or corner of the device such that the camera will likely be able to capture image information of at least a portion of the user while the user is viewing content displayed on the device. For example, the camera 106 in FIG. 1 is on the front of the device such that an angular capture range 108 of the camera can image at least a portion of the user while the viewer is viewing content displayed on the display element of the electronic device. In accordance with the illustrated embodiment, the device further includes a rear-facing camera 107 and four corner cameras (120, 122, 124, 126) also located on the front of the device. These cameras can be used to acquire images and the image information for each image can be used by the device to determine a relative position and/or orientation of the user with respect to the device. Such image information can also be used for object recognition, object tracking, or various other purposes such as various calibration processes that can be used to adjust for any misalignment between the cameras.

It should be understood, however, that there can be additional and/or alternative cameras placed in similar or alternative locations in accordance with various embodiments, and that information from any or all of these cameras can be analyzed as appropriate. For example, a computing device might have a high resolution still camera that is able to capture images useful for performing facial recognition, and might have a lower resolution video camera that can be useful for performing object detection. In other embodiments, a single camera might be used to capture image information for both types of analysis, while still other embodiments might utilize stereo cameras or other elements to determine distance information or perform three dimensional modeling, among other such aspects. As mentioned, some devices might have digital still cameras that are able to capture single images at specific points in time, or digital video cameras that are able to continuously capture image information, which can be referred to as a set of frames in at least some embodiments. Also, for a process such as image recognition to be relatively accurate, the image being analyzed may have to meet some minimum criteria. This can include, for example, adequate lighting and contrast, but can also include factors such as quality of focus and spatial resolution. Accordingly, a device can include additional elements as well, such as illumination elements and focusing optics as discussed elsewhere herein. Each imaging element may be, for example, a camera including a complimentary metal-oxide semiconductor (CMOS) device, a motion detection sensor, a charge coupled device (CCD), an infrared sensor, a quantum dot imager, a gallium arsenide sensor, or any other appropriate image capturing technology.

As mentioned, the device can include stereo cameras on the front or back of the device to perform stereoscopic or three-dimensional (3D) imaging. These cameras are separated by a distance sufficient to enable stereoscopic imaging over at least a determined distance, each with a determined field of view that at least partially overlaps. In some embodiments the stereo cameras each come with auto-focusing mechanisms, enabling the cameras to focus to different depths. When capturing a stereoscopic ("stereo") image, each of the pair of cameras captures an image at approximately the same time. The offset of the cameras will cause the location of objects in each image to be slightly offset, where the amount of offset is a factor of the separation of the cameras and the distance from the cameras to the objects. This varying offset with distance, otherwise known as disparity, provides the perception of depth in the image when the images are combined using a stereovision process.

Figure 1B:
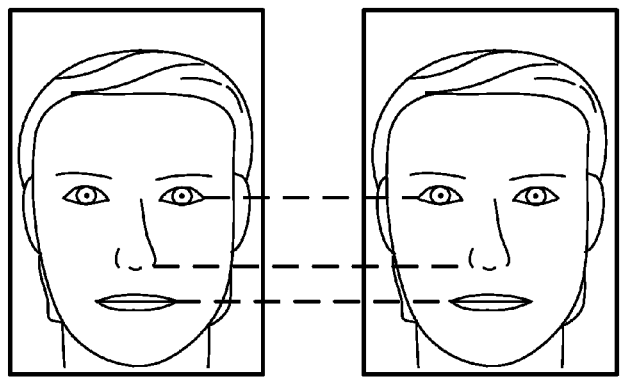
Figure 1C:

As illustrated in the example situation 120 of FIG. 1B, the portable computing device 104 using at least a pair of front-facing stereo cameras (e.g., camera 120 and 122) can be used to capture an image (or video) that includes a representation of the user 102 of the device. As described above, in order for the image of the object to have the desired appearance in the captured stereo image, the cameras have to be aligned such that the object is properly positioned in each image to provide the desired depth information. In the situation where the cameras are aligned, the stereo information captured by a pair of stereo cameras will have the correct amount of disparity for a two- or three-dimensional display. It may be the case, however, that there is some amount of misalignment of at least one of those cameras. For example, situation 140 of FIG. 1C illustrates images from the horizontally offset cameras (e.g., cameras 120 and 122). In this example, however, there is additional offset along the x-axis, which can affect the apparent distance to the user in the three-dimensional image. This movement along the x-axis can be thought of as rotation along the y-axis, or "yaw" as it is often referred. Similarly, there can be an offset along the y-axis 142, due to misalignment of at least one of the cameras. This offset along the y-axis can be attributed to rotation along the x-axis, or "pitch." As previously stated, for horizontally offset cameras, such as cameras 120 and 122, there should be no appreciable offset along the y-axis. Further, there can be an offset along the x-axis and an offset along the y-axis, due to misalignment of at least one of the cameras. The combined offsets could be a translation in the x/y plane, and thus might be addresses as a combination of the previous two offsets. In this situation, however, the offset changes for each feature point in the image, as the misalignment results in a rotation of the image. This rotation along the z-axis is often referred to as "roll."

As mentioned, the cameras can be aligned mechanically to the extent possible and/or practical. However, there may be at least some misalignment such that it can be desirable to compensate for the misalignment through software and/or image processing. A static approach can use a calibration object, such as the calibration grid to enable points to be located in an image captured by each camera, or some other static calibration approach. However, a potential problem with using a static calibration approach is that such a calibration object may not always be available and/or such a process is confusing and/or at least not enjoyable for a user. Further, analyzing full color, high resolution images from one or more cameras to determine complex features can be very processor, resource, and power intensive, particularly for mobile devices.

Accordingly, in accordance with various embodiments, online (or real-time) software and/or image processing can be used to provide a relatively low power but robust calibration approach to compensate for any misalignment between cameras on the device, without the use of such dedicated calibration objects or user interaction. Accordingly, one or more calibration approaches, such as one involving the use of facial features and/or objects as a non-rigid calibration object can be automatically performed to compensate for at least some misalignment between the cameras. Accordingly such approaches address the problem of tracking extrinsic camera parameters (e.g., rotation and translation) to enable the captured stereo images to include a proper amount of disparity or depth information, as well as to have objects aligned in images captured by each camera.

For example, in accordance with various embodiments, given two cameras, $P_l=K_l[R_l][t_l]$ and $P_r=K_r[R_r][t_r]$, a three-dimensional point X can be projected into two images as:

$$x=K_l[R_l][t_l]X, \text{ and}$$

$$y=K_r[R_r][t_r]X,$$

where, K, R, t can be the camera intrinsic, rotation, and translation matrices, respectively. Intrinsic parameters can include, for example, focal length, principal points, lens distortions, as well as other non-linear camera parameters. Variables R and T can be representative of extrinsic camera parameters which can correspond to coordinate system transformation matrixes from three-dimensional (3D) space coordinates to 3D camera coordinates.

As described, an example approach to calibrating one or more cameras of a computing device can include, for example, estimating or otherwise determining camera parameters (e.g., rotation and translation) of each of the camera parameters and updating these parameters to be used to adjust or otherwise calibrate the cameras, such that an object a distance from the computing device will have a proper amount of disparity in a subsequently captured stereoscopic image. In accordance with various embodiments, calibrating cameras can include determining the relationship between a primary and a secondary camera, where the relationship captures the rotation and the translation between the two cameras. The relationship can include, for example, cameras positioned horizontally, vertically, diagonally, or in some other orientation. In accordance with various embodiments, any one of the cameras can be calibrated with another one of the cameras. For example, a "left-top" camera can be calibrated a "bottom-right" camera where bottom, top, left, right is based on the orientation of the device relative to some reference point. In accordance with an embodiment, the rotation and translation parameters can represent the relative rotation and translation of any given camera with respect to a world coordinate system or with respect from each other. The updated parameter values can be used to adjust for any or at least a portion of any misalignment between the cameras. In accordance with various embodiments, determining and updating the parameter values can include, for example, detecting correspondences between feature points, obtaining normalized coordinates for the corresponding feature points, eliminating outlier feature points based on camera geometry, estimating a transformation matrix to determine rotation and translation parameters for the modeled cameras, and smoothing the parameters for use in recalibrating the cameras.

Figure 2A:
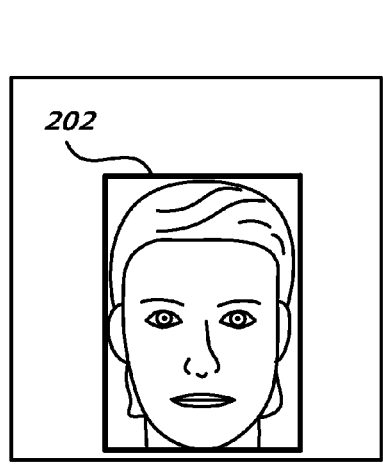
FIGS. 2A, 2B, 2C, and 2D illustrate examples of head location and feature locations that can be determined from a captured image that can be leveraged for rectifying or otherwise accounting for variations in images captured by a pair of stereo cameras in accordance with various embodiments.

As described, to determine calibration parameters (e.g., rotation and translation parameters) of each camera to adjust for misalignment between the cameras, corresponding feature points are detected between at least a first image captured by a first camera and a second image captured by a second camera. For example, as illustrated in FIG. 2A, at least some embodiments utilizes a face or head detection algorithm to attempt to locate an approximate head or face position 202 in a captured image or video frame 200 to determine corresponding feature points between a pair of images. In this example, a computing device with at least two front-facing cameras having at least partially overlapping fields of view can detect the presence of an object, such as a face of a user, represented in stereoscopic image data captured by the front-facing cameras. It should be noted that although two cameras are described, embodiments described herein are not limited to such an arrangement, and those skilled in the art will appreciate that more or fewer cameras can be used. It should be further noted, that although features of a user's face are detected and used in such calibration approaches, any object or features a known or approximated distance from the device can be used in the various approaches described herein. These objects can include a hat the user is wearing, sunglasses, clothing, text on the clothing, jewelry, among other objects that can be detected on and/or proximate to the user.

Figure 2B:
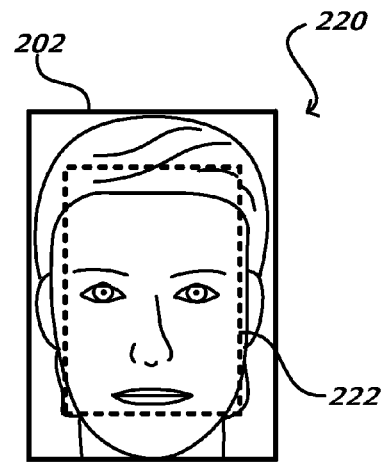

If at least a portion of a representation of the user's face is detected in each image of the pair of images, one or more facial features or feature points can be determined. For example, at least a first image acquired by camera of the stereo camera pair and a second image acquired by camera of the stereo camera pair can be analyzed to attempt to identity feature points corresponding to facial features of the user's face. In accordance with various embodiments, in approaches that attempt to calibrate for any misalignment between cameras of a computing device based at least in part on facial feature of a user using the device, it can improve results in at least some embodiments to sufficiently isolate the person's face, such that variations in the background of the image do not create false positives (or false negatives in some instances). As illustrated in the isolated image portion 220 of FIG. 2B, in some embodiments, an algorithm can analyze only a central portion or region 222 of the determined head position 202, in order to attempt to include primarily facial area and not hair or areas just outside the face region due to differences between the actual shape of the user's face and the shape of the bounding box 202 or other such boundary.

Figure 2C:
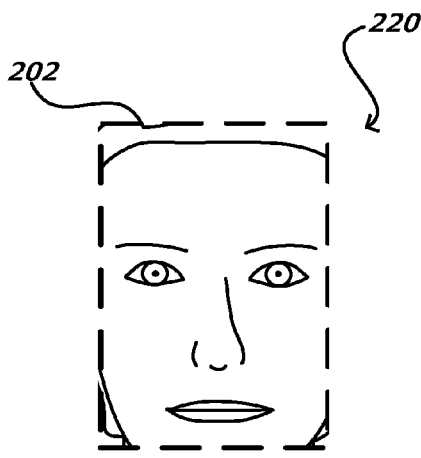

Once the facial region to be analyzed is determined, and tracked or updated over time in the video information, one or more head or face detection algorithms can be used to detect features of the user's face. For example, FIG. 2C illustrates an example situation where a head or face detection algorithm has been used to attempt to locate a portion of the image 220 that corresponds to the approximate facial features of the user's face. The head or face detection algorithm can include any appropriate algorithm known or used for such purposes, such as a template matching algorithm, a neural network algorithm, a Fisher linear discriminant algorithm, a maximal rejection classifier algorithm, a support vector machine algorithm, an edge filtering algorithm, an edge detection algorithm, and the like. The ability to locate the head position in an image can reduce the amount of resources otherwise needed to perform facial recognition, as the analysis can be performed only on the portion of the image corresponding to the head position. Further, in some embodiments facial recognition might not be performed unless a head or face can first be detected in the captured image.

Figure 2D:
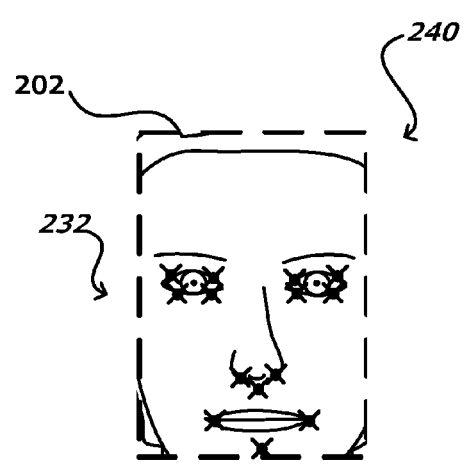

In this example, the detected head portion can be analyzed using one or more facial recognition algorithms or feature point detection algorithms to attempt to identify facial features of the person represented in the image. As illustrated in example 240 of FIG. 2D, this can include identifying unique or distinguishing points such as feature points 232, facial marks, geometric shapes or distances, or other such features on the face. Example facial recognition algorithms can include, for example, a linear discriminate analysis algorithm, a Fisherface algorithm, a Hidden Markov model-based algorithm, a principal component analysis algorithm, and a neuronal motivated dynamic link matching algorithm, among others. In certain embodiments, specially trained Harr classifiers or other like classifiers can be used to detect the facial features. It should be noted that any number of algorithms can be used, as known to those skilled in the art. In various embodiments, the facial features can include at least one of an eye, mouth, nose, among other facial features. The number of detected facial features can be compared to a threshold number of facial features (e.g., 15 different facial features).

In certain embodiments, the number of detected facial features is below the threshold number, for example, because the user's face is occluded due to the user wearing a hat, sunglasses, etc., one or more other features can be determined using at least one of a speeded up robust features (SURF), scale-invariant feature transform (SIFT), a corner detection algorithm, or binary robust invariant scalable keypoints (BRISK) algorithms to determine matching features points in the images captured by the two cameras. For example, a set of feature points image points, or other such features of each image can be determined using one or more feature detection algorithms, as may recognize unique features or shapes, among other such features, that can be recognized in each image. For example, when this image is provided to a feature point recognition algorithm, or other such process, a unique feature point such the tip of the user's nose can be located in each image. As known for such purposes, the feature can be located due to the presence of a transition point, recognized pattern, abrupt change in color or intensity, or other such aspect of the image at that location. In accordance with various embodiments, the set of feature points can include the corners or intersections of the face, areas of the face, or features of the face, which can be extracted by a corner detection algorithm, such as a Harris corners detection algorithm. In some embodiments, face or other well-known detectors can be used to detect feature points of the face represented in the images. In any situation, the features can be any object where one or more points ("feature points") can be used to distinguish each object from other objects in the image.

Figures 3A, 3B:
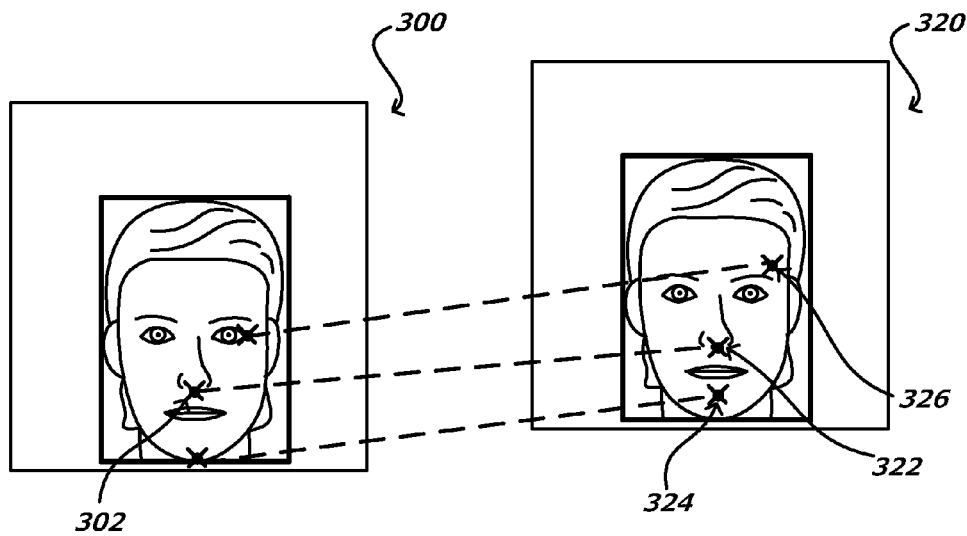
FIGS. 3A, 3B, and 3C illustrate examples of feature locations that can be determined from a captured image that can be leveraged for rectifying images captured by a pair of stereo cameras in accordance with various embodiments.
Figure 3C:
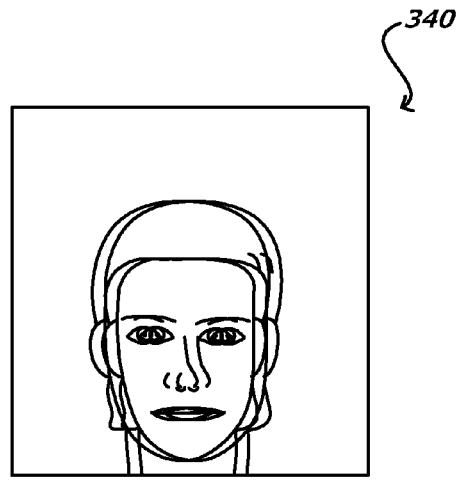

FIGS. 3A, 3B, and 3C illustrate example images that can be used to determine correspondence between one or more feature points that can be leveraged for calibrating a pair of cameras in accordance with various embodiments. FIG. 3A illustrates what will be referred to herein as a "left" image 300 and FIG. 3B illustrates what will be referred to herein as a "right" image 320, although other orientations can be used as well in other situations and embodiments. As described, these images can be captured by one or a pair of cameras that are offset from each other along a horizontal axis, such that one camera is offset to the left and one offset to the right in this orientation. As discussed elsewhere herein, pairs of cameras can be offset in up and down directions, among other such options. Since each image is captured using a camera at a slightly different location, the position of objects in each image will be different. As an example, if one were to overlay one of these images 300 on top of the other 320, as illustrated in the example image 340 of FIG. 3C, it can be seen that each of the objects is slightly offset, with objects closer to the camera being more offset than others, due to disparity differences as discussed previously. When displayed and/or viewed as a three dimensional image, however, the disparity causes the objects in the image to appear to be located at different depths, resulting from the disparity between the two images.

Once a particular feature point 302 is located in the first image 300, the relative position of that point in the image can be analyzed and compared to the relative position in the second image 320 captured by the second camera the stereoscopic pair of cameras. In various embodiments, the corresponding feature points (302 and 322) can be detected in the same portions of the image, only in a different locations (e.g., as a consequence of the spacing of the cameras). These feature points can be matched or other mapped to one another by rotation invariant feature point detectors (such as SIFT, SURF, etc.). Thus, each pair of stereo images generates feature point matches in different portions of the image (even though the features are typically from the same regions of the scene).

It should be further noted that any approach that can determine the relationship between corresponding image points can be used in the embodiments described herein. For example, one such approach includes reverse point matching. In this approach, a feature (e.g., 302) represented in a first image (e.g., 300) acquired by a first camera can be identified in a second image (e.g., 320) acquired by a second camera. For example, for perfectly aligned cameras, such as cameras with perfectly aligned optical axes, the locations of objects imaged by the cameras will appear on the same scan line, but with an offset along the scan line (generally) due to the offset. For example, stereo imaging applications involve the generation and analysis of at least two images of an object from different points of view. Typically, the two images correspond to left and right images generated by cameras positioned along, and orthogonal to, at least two viewpoints on a horizontal axis. Collectively, the left and right images are called a stereo image pair. The left and right images of a stereo image pair may be analyzed to yield disparity data. Disparity is the amount of translation along a conceptual epipolar axis that all objects move along in response to changing the image creation viewpoint. If the cameras are perfectly aligned, both vertically and rotationally, the epipolar axis is identical to the horizontal axis. That is, the corresponding epipolar lines coincide and become parallel to the x-axis of the image.

Corresponding feature points can be identified on the scan line. Feature points positioned a determined distance (e.g., pixels) or degrees, and/or angel from the line can be rejected. This can include, for example, feature points 324 and 326. Further, misalignments in directions other than the offset direction are relatively easy to detect by comparing the location of various object points or features to determine whether those features are on different scan lines. Any change in the offset in a direction other than the camera offset can be indicative of an impact event or other occurrence which caused misalignment of the cameras.

Once the corresponding feature points are determined, the corresponding feature points can be normalized. Normalizing the corresponding feature points can include, for example, removing any or at least a portion of the effect intrinsic camera properties. As described, intrinsic camera properties include focal length, principal points, lens distortions, as well as other non-linear camera parameters. Accordingly, given the known intrinsic camera matrices, $K_l$ and $K_r$, the normalized coordinates can be illustrated as $\bar{x}=\text{undistort}(K_l^{-1}x)$ and $\bar{y}=\text{undistort}(K_r^{-1}y)$, where, undistort (•) is the un-distortion function to remove radial and tangential distortion. For notational convenience, the normalized coordinates will be referred to as x and y.

Once the corresponding feature points are normalized, one or more outlier feature points can be detected and rejected. In this way, corresponding feature points having a correspondence that meets a predetermined threshold are kept. Additionally or alternatively, features having the "best" correspondence can be kept. This can include, for example, keeping a predetermined number of best correspondences. The features that are kept can be used to estimate the essential matrix or other calibration model, which as described, can be used to determine the relative geometry between two or more cameras, such as rotation and translation between the cameras.

One approach to reject outlier feature points includes using the geometric relationship between cameras. For example, as described, for perfectly aligned cameras, such as cameras with perfectly aligned optical axes, the locations of objects imaged by the cameras will appear on the same scan line, but with an offset along the scan line (generally) due to the offset. In this way, feature points located off the scan line more than a predetermined angle, distance, or other measure can be rejected and features located within one or more predetermined thresholds (e.g., angle, distance, etc.) can be used in further calculations.

In another approach, in accordance with an embodiment, given the original (i.e., factory) rotation, $R_{orig}$, and factory translation $t_{orig}$, a transformation matrix can be computed. An example transformation matrix can include, for example, an essential matrix. In accordance with an embodiment, an essential matrix can be a 3×3 matrix which can relate corresponding points in stereo images assuming that the cameras satisfy the pinhole camera model. In accordance with an embodiment, the essential matrix can be illustrated as, for example, $E_{orig}=[t_{orig}]\times R_{orig}$, where [•] x converts a vector to an equivalent cross product matrix. In accordance with various embodiments, for each image frame, correspondences can be eliminated that satisfy $$\|y^T E_{orig} x\|_1 > \frac{th_{epipolar}}{f},$$

where, $th_{epipolar}$ is the threshold for epipolar error in pixels and f is the focal length. As an example, in certain embodiments, $th_{epipolar}$ can be fifteen pixels and $f=K_I(1, 1)$, however it should be noted that various other values can be used as well. In accordance with an embodiment, a predetermined number of correspondences, for example, the top five correspondences can be used based at least in part on the smallest epipolar error score. In accordance with various embodiments, the epipolar error score can be determined by $\|y^T E_{orig} x\|_1$.

In accordance with various embodiments, the essential matrix, $E_f$, can be estimated using a predetermined number of feature correspondences. For example, using the predetermined most recent feature correspondences from a sliding window, $(xi, yi)_{i \in 1 \ldots n}$, $E_f$ can be determined by employing at least one normalized 8-point algorithm for frame f.

In accordance with an embodiment, once the essential matrix, $E=[t]_x R$, is computed, the rotation R and translation t parameters can be retrieved from the essential matrix up to, for example, scale and a four-fold ambiguity. In accordance with various embodiments, to remove the four-fold ambiguity, one or more constraints from original (factory) parameters can be used to select the correct solution where, in this example:

$$W = \begin{pmatrix} 0 & -1 & 0 \\ 1 & 0 & 0 \\ 0 & 0 & 1 \end{pmatrix}, Z = \begin{pmatrix} 0 & 1 & 0 \\ -1 & 0 & 0 \\ 0 & 0 & 0 \end{pmatrix}, \text{ and } U\text{diag}(1, 1, 0)V^T = E$$

In accordance with various embodiments, in this example, t can be $+u_3$ or $-u_3$ (where $u_3$ is the third column of U) and R can be $UWV^T$ or $UW^TV^T$. A solution can be selected such that $\cos^{-1}(t_{orig} \cdot t) < th_{t-angle}$ and $\max(\text{Euler}(R^T_{orig}R)) < t_{hR-angle}$, where, Euler(•) gives the Euler-angle representation of a rotation matrix and max(•) returns the maximum component (in absolute value terms) of the vector input. In accordance with an embodiment, $t_{ht-angle}$ can be set to five degrees and $t_{hR-angle}$ can be set to ten degrees.

In accordance with various embodiments, the rotation and translation parameters can be smoothed over time to generate a continuous stream of rotation and translation parameters. For example, a continuous stream of rotation and translation parameters can be generated for each frame (or at each time interval), f. In certain embodiments, to help ensure approaches are robust to noise, the rotation and translation estimates can be filtered. When smoothing translation parameters, the translation parameters can be filtered, for example, in an infinite impulse response (IIR) framework where $\bar{t}_f = (1-\alpha)\bar{t}_{t-1} + \alpha t_f$, where $\alpha$ can be set to 0.005, for example, or some other value such as zero.

In accordance with various embodiments, several approaches are available to smooth rotational parameters. One such approach includes quaternion averaging. In this approach, if $q_i$ denotes the 4×1 quaternion representation of a rotation $R_i$, then the average rotation parameter, q, of $\{q_i\}_{i \in 1 \ldots k}$, can be computed as the eigenvector corresponding to the largest eigenvalue of A, where $$A = \frac{1}{k}\sum_{i=1}^{k} q_i q_i^T.$$

to accordance wan an embodiment, k can be set to, for example fifty, but other values contemplated within the embodiments described herein. When calibration parameters are determined that at least meet a predetermined confidence or threshold, those parameters are stored and replace the current T and r.

In various embodiments, the updated translation and rotation parameters can be used to correct for any misalignment between the cameras. In accordance with various embodiments, a calibration approach can include at least one of gradient descent search and/or variational or stochastic methods. In another such approach, updated parameters can then be used to represent the relationship between feature points in the stereo images, where the features are projections of the same object element. For example, given a feature point in one image, its corresponding point must lie on an epipolar line in the other image, allowing for the detection of incorrect correspondences. In this way, when the epipolar geometry is not in a cannonical form, the image pairs can be adjusted to make corresponding points lie on the same scan lines. This process is known as image rectification, and can be accomplished by using the updated parameters in one or more 2-D projective transformations. For example, offset values determined from the parameters for the feature points can be determined, and in at least some embodiments, a model (e.g., a "calibrating model") of the camera(s) capturing that image can be generated. The calibrating model or mappings can include transforms or adjustments to be made to an image captured by one or both of the cameras in order to reduce misalignment. For example, based at least in part upon the model or mappings, the appropriate image adjustments can be made to align the pair of cameras. For example, each point on a grid can be located in an image captured by each camera, and an offset or function determined for matching these locations in the image, with respect to the expected amount of disparity between the images for the location of the calibration object.

Further, in some embodiments, an overall adjustment such as an amount of rotation can be determined that should be applied to an image captured by at least one of the cameras. For example, if one of the cameras is determined to be angled at 0.5 degrees with respect to the other camera, images captured by one of the cameras can be rotated by 0.5 degrees to align the images. Similarly, if there is a determined translation or offset in terms of pixel values, distances, etc., at least one of the images can be shifted to compensate for the offset. Upon computing the calibration matrix, and once a subsequent stereoscopic image is captured using the pair of cameras, the model obtained therefrom can be applied to each image to account for misalignment effects due to the misaligned stereo camera pair before providing the stereoscopic image for display. For example, upon applying the model or mapping to a subsequently captured image can account for, or remove, the offset due to the misaligned cameras.

Figure 4:
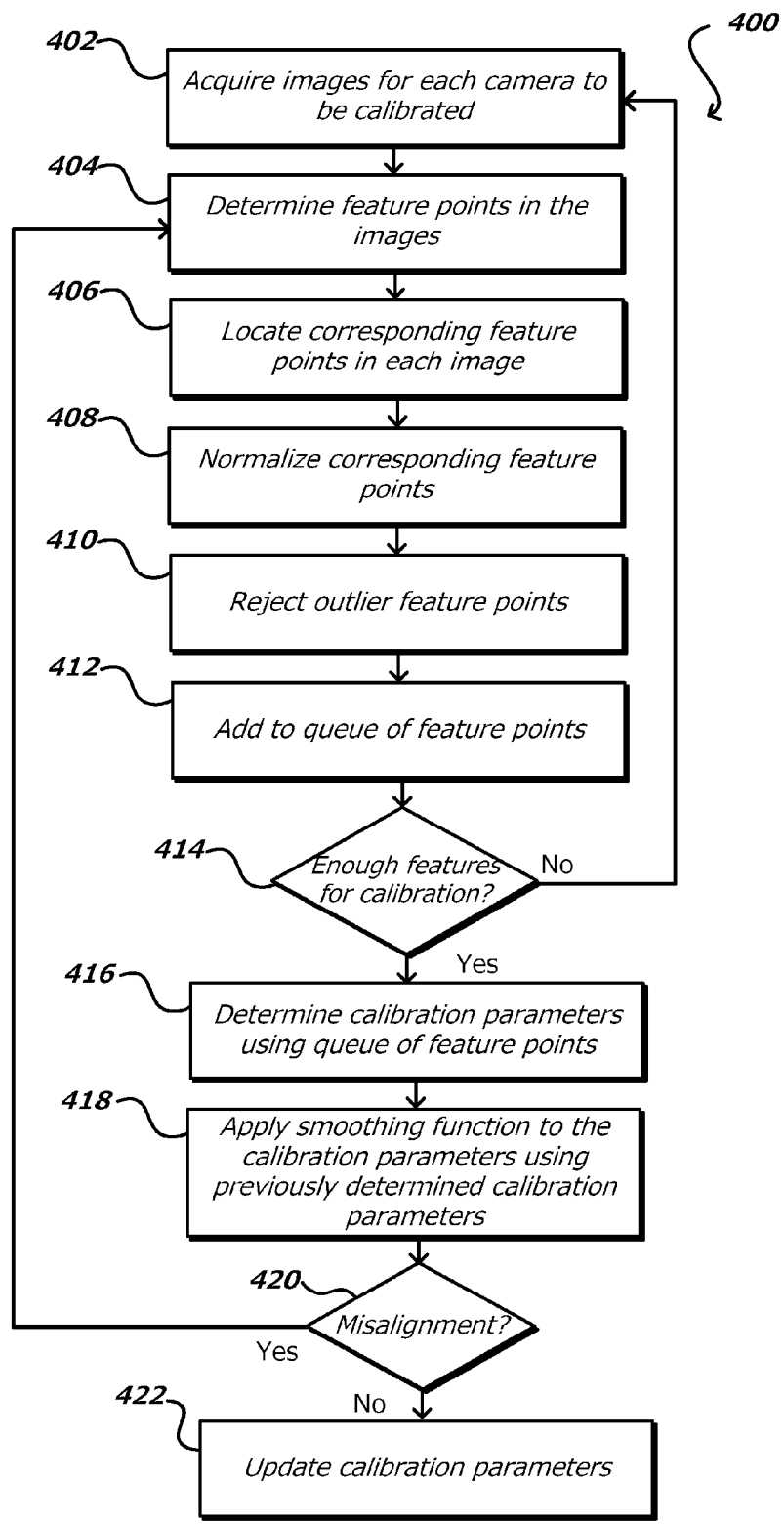
FIG. 4 illustrates an example process for rectifying or otherwise accounting for variations in images captured by a pair of stereo cameras in accordance with various embodiments.

FIG. 4 illustrates an example process 400 for calibrating two or more cameras of a computing device that can be utilized in accordance with various embodiments. It should be understood that, for various processes discussed herein, there can be additional, fewer, or alternative steps performed in similar or alternative orders, or at least partially in parallel, in accordance with the various embodiments unless otherwise stated. Further, the entire process can be performed on a single device in some embodiments, while at least portions of the process can be performed using one or more other computing devices, such as a remote server, in accordance with various embodiments. As described above, in order for the images to combine to form an accurate three-dimensional image, the cameras used to capture the component images should be sufficiently aligned and/or calibrated to represent the correct amount of disparity. Misalignments along the direction of the offset can cause objects to have an incorrect amount of disparity, which can affect the apparent depth or distance to the object. Misalignments in other directions can cause various potential problems, such as problems with processing computer vision algorithms, problems with objects being blurry or otherwise improperly rendered when the component images are combined for the three-dimensional image, etc. Accordingly, it can be desired to account for, and remove, any effects of the misalignment of the cameras. As mentioned, cameras can be increasingly misaligned over time, due to factors such as impact or shock to the device, natural degradation (e.g., due to temperature and/or humidity), vibration over time, mechanical wear or failure, and other such causes.

Conventional camera calibration algorithms use some sort of patterns like checkerboards, patterns, and/or various other external objects and users explicitly initiate the calibration process. However, this is not a desired user experience and can be desirable to enable a computing device or electronic device including the cameras to be able to automatically rectify the stereo cameras without manual intervention by the user, although manual intervention or triggering can be used in some embodiments. It also can be desirable to enable the calibrating to be done without the need for a calibration object or other such item.

Accordingly, various embodiments enable a computing device to automatically perform a recalibration process after the device has left the manufacturer and/or is in the possession of a user. The calibration can be performed at any appropriate time, such as at regular intervals, at random times, or in response to detected events, such as rapid movements or force as detected by a motion sensor or other component of the device. In various embodiments, the automatic calibration process can be performed upon detecting incontinences in images acquired from any number of stereoscopic pair of cameras. This can include, for example, using one or more algorithms to detect that images captured using a pair of stereoscopic cameras appears blurry, distorted, or otherwise out of focus. Where there are multiple pairs of stereo cameras on a device, different combinations of the cameras can be used to improve the calibration of each camera.

In certain embodiments, prior to analyzing images, a number of checks or preprocessing approaches can be performed to determine whether the pair of images are optimal candidates for use in one or more calibration processes. In one example, a preprocessing approach can include determining whether the images include at least a threshold amount of light. Determining whether the images include the threshold amount of light can include determining image statistics such as a level of gain, an average level of light, and/or a histogram representative of a level of light, and comparing at least one of those statistics to a corresponding threshold. For example, in the situation where at least one of the level of gain, the average level of light, or the histogram representative of the level of light at least meet a threshold amount, it can be determined that there is a sufficient level of light in the images. In another example, a preprocessing approach can include determining whether a level of ambient light meets a threshold amount of ambient light. In response to determining that there is at least a threshold amount of light, additional preprocessing approaches can be performed. One such approach can include determining whether there is at least a portion of a face in each image of the pair of images. This can be determined using one or more face detection algorithms.

In this example, stereoscopic data (images and/or video) and proximity data can be captured concurrently or otherwise associated with each other based on time of capture/acquisition, as may include capturing such data as close to simultaneously as possible or otherwise captured such that there is a sufficiently high likelihood that the fields of view experience minimal changes during the time between the capturing of each image (e.g., less than 100 milliseconds), in order to reduce the effects of motion of an object or the computing device on the distance determinations.

For example, images can be simultaneously and/or concurrently acquired 402 using each camera to be calibrated. As discussed, this can include two or more pairs of cameras arranged in a pattern, such as a rectangle or regular array, such that different pairs of the cameras can be used to perform three-dimensional imaging, and the pairs can be selected in at least two different directions, which in at least some embodiments are orthogonal directions. Also, as discussed elsewhere herein, in at least some embodiments all cameras of interest do not have to capture a respective image at substantially the same time, but at least pairs of cameras to be calibrated should capture images at substantially the same time. In various embodiments, a number of images captured and processed to account for any misalignment between the cameras can be based on a desired level of alignment accuracy, wherein a first amount of images captured and processed greater than a predetermined number can result in a first level of accuracy and a second amount of images captured and processed less than the predetermined number of images can result in a second level of accuracy. In some situations, the first level of accuracy can be greater than then second level of accuracy. Further, there can be more or fewer than two levels of accuracy, such as one, three, or more. Further still, the level of accuracy need not depend on the number of captured and processed images and can be based on other factors, such as the quality of the captured images, a number of detected features, etc.

In any situation, each captured image can be analyzed to determine 404 one or more of feature points, image points, or other such features using one or more feature detection algorithms, as may recognize unique features or shapes, among other such features, that can be recognized in each image. This can include, for example, detecting the user's head, face, and/or facial features. In various embodiments, as known for such purposes, feature points can be determined using algorithms such as feature detection algorithms (e.g., SIFT or SURF), corner finding algorithms, pattern matching algorithms, a patch-based algorithm, contour detection algorithms, and the like. For this example, the process uses a facial feature detection algorithm to locate specific points in each image corresponding to facial features.

Corresponding feature points can then be located 406 in each of the captured images, to the extent those feature points are represented in each of those images. Thus, a feature point corresponding to an object represented in an image captured by four cameras will have four pairs of coordinates, with an (x,y) or other such pair of coordinates representing the location of that feature point in each image. For example, for purposes of explanation, each feature point in an image captured by camera #1 (120 in the example of FIG. 1A) can have representative coordinates of $(x_1, y_1)$, each corresponding feature point in an image captured by camera #2 (122 in the example of FIG. 1A) will have representative coordinates of $(x_2, y_2)$, etc. As discussed elsewhere herein, the examples utilize a single feature point for purposes of explanation, but it should be understood that multiple feature points will generally be analyzed and/or otherwise utilized in various analyses within the scope of the various embodiments.

Corresponding feature points can be normalized 408 to remove or at least reduce the effect due to one or more intrinsic camera characteristics, as may include focal length, principle point, etc. In this way, extrinsic camera characteristics between the camera such as rotation and translation can be updated to adjust for any misalignment between the cameras. Once the feature points are normalized, one or more outlier feature points can be rejected 410. For example, matching feature points having a correspondence that meets a predetermined correspondence threshold can be kept and used in various calibration approaches. A correspondence threshold corresponds to, for example, an allowable deviation with respect to a reference point between corresponding feature points. The allowable deviation can be measured in, for example, a number of pixels or some other measurement. The reference point can be, for example, a scan line, an epipolar line, or other reference point between two cameras.

In accordance with an embodiment, one approach to reject outlier feature points includes using the geometric relationship between cameras. For example, as described, for perfectly aligned cameras, such as cameras with perfectly aligned optical axes, the locations of objects imaged by the cameras will appear on the same scan line, but with an offset along the scan line (generally) due to the offset. In this way, feature points located off the scan line more than a predetermined angle, distance, or other measure can be rejected and features located within one or more predetermined correspondence thresholds (e.g., angle, distance, etc.) can be used in further calculations.

Once the feature points are normalized, the coordinates of those feature points in each image can be determined and the normalized feature points can be used to adjust one or more calibration of the cameras, such that the face of the user at that distance will have the proper amount of disparity in a subsequently captured stereoscopic image. The calibration parameters can include rotation and translation parameters that can correspond to lateral offset amounts for small angles. In other cases, the calibration parameters can include misalignments in roll, pitch, and/or yaw for any or all of the cameras analyzed, such that disparity can be corrected for subsequent images.

Accordingly, corresponding features points can be added 412 to a queue or sliding window. This can include, for example, storing a predetermined number of features points. A determination 414 can be made as to whether the number of feature points in the queue reaches a predetermined amount or range of feature points. For example, in the situation where the number of feature points in the queue is less than a predetermined amount or range (e.g., 1500 feature points) of feature points, then steps 402-412 can be repeated until at least the number of feature points reaches the predetermined amount or range of feature points. In the situation where the number of feature points in the queue at least reaches the predetermined amount, the corresponding feature points in the queue can be used to determine 416 calibration parameters such as at least rotation and translation parameters and/or various other parameters of the cameras.

In accordance with various embodiments, as new calibration parameters are determined, the new calibration parameters can be "averaged" or smoothed with previous calibration parameters. For example, various smoothing functions can be applied 418 to the calibration parameters using previously determined parameters to generate a continuous stream of parameters for each frame (or at each time interval) and the smoothed parameters can be used to adjust or otherwise calibrate the cameras such that an object a distance from the computing device will have a proper amount of disparity in a subsequently captured stereoscopic image.

For example, in one such approach using the calibration parameters mentioned above, an essential matrix or calibrating model can be used to adjust images acquired by the cameras based at least in part on the relationship between the cameras. For example, rotation, translation, and/or other offset values for the feature points can be determined, and in at least some embodiments, a model (e.g., a "calibrating model") of the camera(s) capturing that image can be generated. The calibrating model or mappings can include transforms or adjustments to be made to an image captured by one or both of the cameras in order to reduce misalignment. For example, based at least in part upon the model or mappings, the appropriate image adjustments can be made to align the pair of cameras (e.g., the left and right stereo cameras). For example, an overall adjustment such as an amount of translation and/or rotation can be determined that should be applied to an image captured by at least one of the cameras.

When it is determined 420 that the cameras are aligned to at least a threshold level, the results (e.g., calibration parameters) then the model and/or calibration parameters can be updated 422 and thereafter applied to subsequent images, where applying the model or calibration parameters to a subsequently captured image can account for, or remove, the offset due to the misaligned cameras. Subsequent images captured by the stereo camera pair can be analyzed to determine whether the model or calibration parameters removed the offset due to the misalignment. In various embodiments, the calibration parameters can be stored as misalignment corrections to be applied to images captured by each of the cameras. Various other types of correction or misalignment data can be stored as well within the scope of the various embodiments. If a device has a mechanical mechanism for realigning the cameras, this information can alternatively be provided to the mechanism instead of being stored for future image adjustments. In embodiments where the misalignments are relative, the values stored can be normalized and/or adjusted such that the minimum average amount of adjustment is applied to each camera while still accounting for misalignment.

When it is determined that the cameras are misaligned, the process can repeat. As discussed, the process can be repeated at relatively regular and/or short intervals, or at other appropriate times, in order to ensure that the cameras are relatively aligned and that any misalignment errors are small. The ability to periodically detect and solve for small misalignments in yaw, pitch, and/or roll misalignment errors enables the calibration parameters to be updated and applied over time in order to maintain acceptable stereo rectification.

Figure 5:
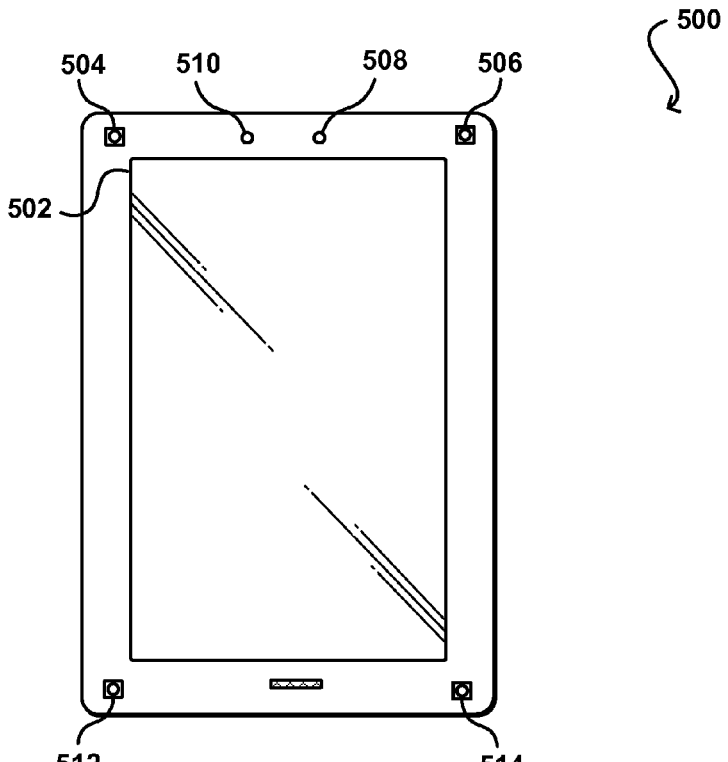
FIG. 5 illustrates a view of an example portable computing device that can be used in accordance with various embodiments.

FIG. 5 illustrates an example computing device 500 that can be used to perform methods in accordance with various embodiments discussed and suggested herein. In this example, the device has four image capture elements 504, 506, 512, 514 positioned at various locations on the same side of the device as a display element 502, enabling the device to capture image information about a user of the device during typical operation where the user is at least partially in front of the display element. In this example, each capture element is a camera capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices.

In this example, a light sensor 508 is included that can be used to determine an amount of light in a general direction of objects to be captured and at least one illumination element 510, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. The device can have a material and/or components that enable a user to provide "squeeze" input to the device by applying pressure at one or more locations. A device casing can also include touch-sensitive material that enables a user to provide input by sliding a finger or other object along a portion of the casing. Various other elements and combinations of elements can be used as well within the scope of the various embodiments as should be apparent in light of the teachings and suggestions contained herein.

Figure 6:
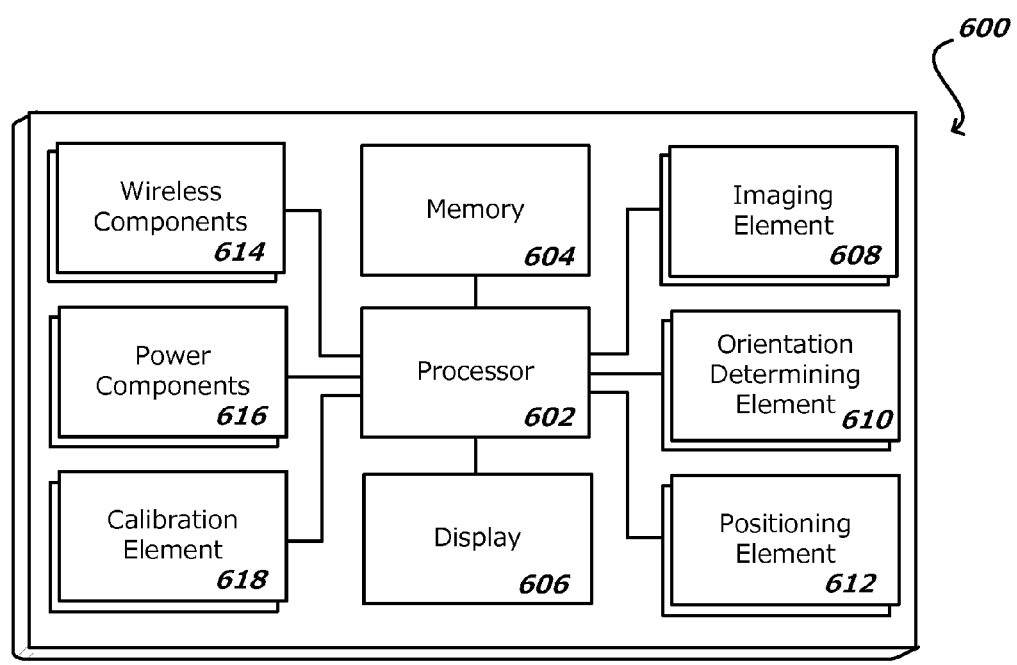
FIG. 6 illustrates an example set of basic components of a portable computing device, such as the device described with respect to FIG. 5.

FIG. 6 illustrates a set of basic components of an electronic computing device 600 such as the device 500 described with respect to FIG. 5. In this example, the device includes at least one processing unit 602 for executing instructions that can be stored in a memory component or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of communication approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such component. Various other elements and/or combinations are possible as well within the scope of various embodiments.

In some embodiments the device can include a calibration element 618. The calibration element can be configured to perform one or more operations to calibrate cameras of the computing device. For example, a computing device with at least two front-facing cameras having at least partially overlapping fields of view can detect the presence of an object, such as a face of a user, facial features of the user, and/or any features represented in stereoscopic image data captured by the front-facing cameras. Portions of at least a first image acquired by a first camera of the stereo camera pair and a second image acquired by a second camera of the stereo camera pair can be analyzed to attempt to identity feature points corresponding to facial features of the user's face or other objects represented in the images. A location of the identified feature points from the first image can be compared to a location of the identified features points from the second image to generate a mapping between corresponding feature points. Corresponding feature points can be normalized to remove or at least reduce the effect of one or more intrinsic camera characteristics, as may include focal length, principle point, etc. In this way, extrinsic camera characteristics between the camera such as rotation and translation can be updated to adjust for any misalignment between the cameras.

Once the feature points are normalized, one or more outlier feature points can be rejected as will be described further herein. Thereafter, at least a portion of the remaining corresponding feature points can be used to adjust one or more calibration of the cameras, such that the face of the user at that distance will have the proper amount of disparity in a subsequently captured stereoscopic image. For example, the corresponding feature points can be used to determine at least rotation and translation parameters and/or various other parameters of the cameras.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 7:
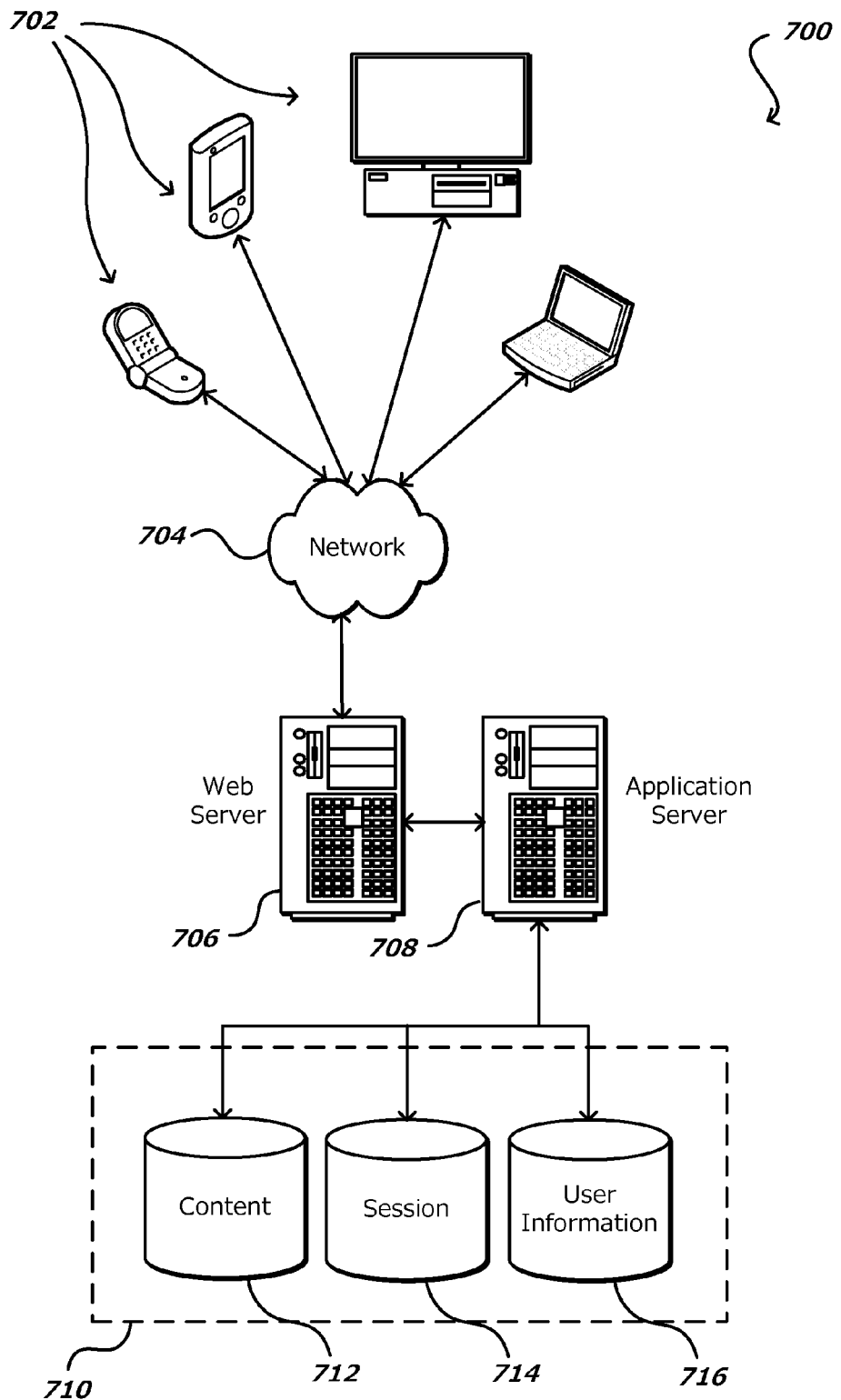
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes electronic client devices 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected.

Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any component or combination of components capable of storing, accessing and retrieving data, which may include any combination and number of data servers, databases, data storage components and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client devices 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized components, each such component can include hardware elements that may be electrically coupled via a bus, the elements including, for example, at least one central processing unit (CPU), at least one input component (e.g., a mouse, keyboard, controller, touch-sensitive display element or keypad) and at least one output component (e.g., a display component, printer or speaker). Such a system may also include one or more storage components, such as disk drives, optical storage components and solid-state storage components such as random access memory (RAM) or read-only memory (ROM), as well as removable media components, memory cards, flash cards, etc.

Such devices can also include a computer-readable storage media reader, a communications component (e.g., a modem, a network card (wireless or wired), an infrared communication component) and working memory as described above. The computer-readable storage media reader can be connected with, or configured to receive, a computer-readable storage medium representing remote, local, fixed and/or removable storage components as well as storage media for temporarily and/or more permanently containing, storing, transmitting and retrieving computer-readable information. The system and various devices also typically will include a number of software applications, modules, services or other elements located within at least one working memory component, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage components or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a computing device processor;
   a first camera having a first field of view;
   a second camera separated a distance from the first camera, the second camera having a second field of view that at least partially overlaps the first field of view;
   a memory device including instructions that, when executed by the computing device processor, cause the computing device to:
      capture first image data by the first camera and second image data by the second camera, the first image data and the second image data being captured concurrently;
      cause the first image data and the second image data to be analyzed to locate a first representation of an head portion corresponding to a head of a user of the computing device in the first image data and a second representation corresponding to the head portion in the second image data;
      analyze the first representation and the second representation using a facial recognition algorithm to determine substantially a same facial feature represented in both the first representation and in the second representation;
      determine, based at least in part on camera geometry between the first camera and the second camera, a mapping between the facial feature in the first representation and the facial feature in the second representation to determine corresponding facial features between the first representation and the second representation;
      normalize the facial feature in the first representation, to at least partially remove an intrinsic characteristic associated with the first camera;
      normalize the facial feature in the second representation, to at least partially remove an intrinsic characteristic associated with the second camera;
      generate a calibration model characterizing a rotation and translation between the first camera and the second camera based at least in part on the mapping;
      generate an updated calibration model by applying at least a quaternion averaging function to a rotation parameter of the calibration model and by applying at least an infinite impulse response (IIR) function to a translation parameter of the calibration model; and
      apply the updated calibration model to one or more subsequent image data captured by at least one of the first camera or the second camera to reduce misalignment effects in the one or more subsequent image data.

2. The computing device of claim 1, wherein the instructions when executed further comprises causing the computing device to:
   reject the facial feature represented in the first representation and the facial feature represented in the second representation in response to determining that the facial feature represented in the second representation is outside a predetermined correspondence threshold, wherein the predetermined correspondence threshold corresponds to an allowable deviation with respect to a reference point.

3. The computing device of claim 1, wherein the instructions when executed further comprises causing the computing device to:
   track a position of the head of the user using one of the first image data or the second image data for head tracking; and
   determine, while concurrently performing head tracking, at least one of the rotation parameter or the translation parameter to calibrate for at least one of yaw, pitch, or roll misalignment for one of the first camera, the second camera, a third camera, or a fourth camera of the computing device, wherein the calibration model is generated from image data captured from two or more of the first camera, the second camera, the third camera, or the fourth camera.

4. The computing device of claim 1, wherein the intrinsic characteristic includes at least one of a focal length, a camera lens distortion parameter, or a scale factor principal point parameter.

5. A method, comprising:
receiving first image data and second image data, the first image data from a first camera and the second image data from a second camera, the first camera and the second camera having partially overlapping fields of view;
determining a first location of a feature point represented in the first image data;
normalizing the first location of the feature point represented in the first image data, to at least partially remove an intrinsic characteristic associated with the first camera;
determining a second location of the feature point represented in second image data;
normalizing the second location of the feature point represented in the second image data, to at least partially remove an intrinsic characteristic associated with the second camera;
determining, using at least the first location and the second location, calibration parameters to correct for misalignment between the first camera and the second camera in at least one dimension;
generating smoothed calibration parameters by applying a first smoothing function and a second smoothing function to the calibration parameters, wherein the first smoothing function includes at least a quaternion averaging function, and the second smoothing function includes at least an infinite impulse response (IIR) function;
determining that the first camera and the second camera are misaligned by a threshold amount; and
generating updated calibration parameters based at least in part on the smoothed calibration parameters to correct for misalignment errors of at least one subsequent image captured by at least one of the first camera or the second camera.

6. The method of claim 5, further comprising:
determining a correspondence between the feature point represented in the first image data and the feature point represented in the second image data using at least one of a speeded up robust feature (SURF) algorithm, a scale-invariant feature transform (SIFT) algorithm, a patch-based algorithm, a corner detection algorithm, or a binary robust invariant scalable keypoints (BRISK) algorithm.

7. The method of claim 6, further comprising:
determining, based at least in part on camera geometry between the first camera and the second camera, a mapping between the feature point represented in the first image data and the feature point represented in the second image data, wherein the feature point represented in the first image data and the feature point represented in the second image data are located within a correspondence threshold.

8. The method of claim 7, wherein determining the mapping is further determined using coordinates for bodily feature points represented in first image data and the second image data, and wherein the bodily feature points include at least one of facial markings of a viewer of a computing device, geometric shapes or distances associated with at least one of a viewer's eyes, nose, mouth, chin, or ears, or one or more other features associated with the viewer of the computing device.

9. The method of claim 6, further comprising:
rejecting the feature point represented in the first image data and the feature point represented in the second image data in response to determining that the feature point represented in the second image data is outside a predetermined correspondence threshold.

10. The method of claim 5, wherein the intrinsic characteristic includes at least one of a focal length, a camera lens distortion parameter, or a scale factor principal point parameter.

11. The method of claim 5, further comprising:
acquiring a subsequent pair of images using the first camera and the second camera; and
using the updated calibration parameters to correct for misalignment between the first camera and the second camera to construct a three-dimensional image from the subsequent pair of images.

12. The method of claim 5, wherein the calibration parameters include at least a rotation parameter and a translation parameter, the calibration parameters corresponding to a geometric relationship between at least the first camera and the second camera.

13. The method of claim 5, wherein determining the calibration parameters is performed as part of an automatic calibration process, and wherein the automatic calibration process is executed at least one of continuously, at relatively fixed intervals, upon activating image capture, upon detecting incontinences in images from the first camera and the second camera, after a type of motion experienced by a computing device, in response to determining a predetermined number of feature points.

14. The method of claim 5, wherein determining calibration parameters includes:
determining a set of linear equations for the first camera and the second camera, the set of linear equations including at least one calibration parameter for misalignment in at least one of yaw, pitch, or roll for the first camera and the second camera; and
solving the set of linear equations to obtain a value for the at least one calibration parameter to correct for at least one of yaw, pitch, or roll misalignment the first camera and the second camera.

15. A computing device, comprising:
a computing device processor;
a memory device including instructions that, when executed by the computing device processor, cause the computing device to:
receive first image data and second image data, the first image data from a first camera and the second image data from a second camera, the first camera and the second camera having partially overlapping fields of view;
determine a first location of a feature point represented in the first image data;
normalize the first location of the feature point represented in the first image data, to at least partially remove an intrinsic characteristic associated with the first camera;
determine a second location of the feature point represented in second image data;

normalize the second location of the feature point represented in the second image data, to at least partially remove an intrinsic characteristic associated with the second camera;

determine, using at least the first location and the second location, calibration parameters to correct for misalignment between the first camera and the second camera in at least one dimension;

apply a first smoothing function and a second smoothing function to the calibration parameters to generate updated calibration parameters, wherein the first smoothing function includes at least a quaternion averaging function, and the second smoothing function includes at least an infinite impulse response (IIR) function;

determine that the first camera and the second camera are misaligned by a threshold amount; and use the updated calibration parameters to correct for misalignment errors of at least one subsequent image captured by at least one of the first camera or the second camera.

16. The computing device of claim 15, wherein the instructions when executed further cause the computing device to:

determine a correspondence between the feature point represented in the first image data and the feature point represented in the second image data using at least one of a speeded up robust feature (SURF) algorithm, a scale-invariant feature transform (SIFT) algorithm, a patch-based algorithm, a corner detection algorithm, or a binary robust invariant scalable keypoints (BRISK) algorithm.

17. The computing device of claim 16, wherein the instructions when executed further cause the computing device to:

determine, based at least in part on camera geometry between the first camera and the second camera, a mapping between the feature point represented in the first image data and the feature point represented in the second image data, wherein the feature point represented in the first image data and the feature point represented in the second image data are located within a correspondence threshold.

18. The computing device of claim 16, wherein the instructions when executed further cause the computing device to:

reject the feature point represented in the second image data in response to determining that the feature point represented in the second image data is outside a predetermined correspondence threshold.

\* \* \* \* \*